(12) United States Patent
Adendorff et al.

(10) Patent No.: US 11,852,336 B2
(45) Date of Patent: Dec. 26, 2023

(54) METHOD AND BURNER FOR HEATING A FURNACE FOR METAL PROCESSING

(71) Applicant: Messer Industries USA, Inc., Bridgewater, NJ (US)

(72) Inventors: Martin Adendorff, Shanghai (CN); Joachim Von Scheele, Shanghai (CN)

(73) Assignee: MESSER INDUSTRIES USA, INC., New Castle, DE (US)

( * ) Notice: Subject to any disclaimer, the term of this patent is extended or adjusted under 35 U.S.C. 154(b) by 332 days.

(21) Appl. No.: 16/607,869

(22) PCT Filed: Apr. 26, 2017

(86) PCT No.: PCT/CN2017/081959
§ 371 (c)(1),
(2) Date: Oct. 24, 2019

(87) PCT Pub. No.: WO2018/195789
PCT Pub. Date: Nov. 1, 2018

(65) Prior Publication Data
US 2020/0116350 A1    Apr. 16, 2020

(51) Int. Cl.
| | | |
|---|---|---|
| F23D 14/22 | (2006.01) | |
| C21D 1/76 | (2006.01) | |
| F23D 14/32 | (2006.01) | |
| F23D 14/58 | (2006.01) | |
| F27D 99/00 | (2010.01) | |

(52) U.S. Cl.
CPC ............ *F23D 14/22* (2013.01); *C21D 1/76* (2013.01); *F23D 14/32* (2013.01); *F23D 14/58* (2013.01); *F27D 99/0033* (2013.01)

(58) Field of Classification Search
None
See application file for complete search history.

(56) References Cited

U.S. PATENT DOCUMENTS

| | | | |
|---|---|---|---|
| 3,427,151 A * | 2/1969 | Koudelka | ............ C21C 5/32 75/681 |
| 4,890,562 A | 1/1990 | Gitman | |
| 4,952,218 A | 8/1990 | Lipp et al. | |
| 5,378,261 A | 1/1995 | Aizatulov et al. | |
| 6,342,086 B1 | 1/2002 | Shver | |

(Continued)

FOREIGN PATENT DOCUMENTS

DE    102007032376 A1    1/2009

OTHER PUBLICATIONS

PCT International Search Report for PCT/CN2017/081959, dated Jan. 25, 2018, Authorized Officer: Peili Niu, 8 pgs.

(Continued)

*Primary Examiner* — Scott R Kastler
(74) *Attorney, Agent, or Firm* — Joshua L. Cohen

(57) ABSTRACT

A method for heating a furnace (40) used for metal processing by combusting a fuel in the furnace (40) by supplying an oxidizing gas through an oxidizing gas supply line (20) into the furnace (40) and by supplying a fuel through a fuel supply line (30) into the furnace (40), wherein the oxidizing gas is supplied in form of a central oxidizing gas flow (24) together with a first shroud gas flow (25), and/or the fuel is supplied in form of a central fuel flow (34) together with a second shroud gas flow (35), and to a corresponding burner (10).

13 Claims, 2 Drawing Sheets

(56) References Cited

U.S. PATENT DOCUMENTS

| | | | | |
|---|---|---|---|---|
| 2005/0252430 A1* | 11/2005 | Satchell | ............... | F23L 7/007 |
| | | | | 110/347 |
| 2014/0170573 A1* | 6/2014 | Simpson | ............... | F23D 14/24 |
| | | | | 431/12 |
| 2020/0116350 A1* | 4/2020 | Adendorff | ............... | C21D 1/76 |

OTHER PUBLICATIONS

PCT Written Opinion for PCT/CN2017/081959, dated Jan. 24, 2018, Authorized Officer: Peili Niu, 4 pgs.

\* cited by examiner

METHOD AND BURNER FOR HEATING A FURNACE FOR METAL PROCESSING

FIELD OF THE INVENTION

The present invention relates to a method and a burner for heating a furnace for metal processing by combusting a fuel in the furnace by supplying an oxidizing gas through an oxidizing gas supply line into the furnace and by supplying a fuel through a fuel supply line into the furnace.

BACKGROUND OF THE INVENTION

In the metal production industry the melting, tapping and casting operation processes need to be optimized in respect of the following aspects. Preheating and heating ladles in the furnace to the required temperatures have to be performed efficiently while loss of heat through flue gases is to be reduced as far as possible. With conventional heating processes, it can be difficult to control the temperature flame shape, heating window and stoichiometric ratio. The resulting unfavorable conditions can shorten the lifespan of refractory materials. Further, smoke and pollution as well as emissions of harmful gases, like NOx have to be avoided. Existing flameless and semi flameless burner technology offers an effective means of optimizing furnace preheating and heating processes during combustion of fuel by an oxy-fuel burner. Combustion gases are mixed into the combustion reaction zone to dilute the reactants. This distributes the combustion, delays the release of heat and lowers the peak flame temperature, thus reducing NOx emissions. Mixing combustion gases into the flame also disperses energy throughout the entire furnace, ensuring faster and more uniform heating. Corresponding ladle preheating systems by the applicant are known under the designation OXYGON.

Another low-temperature oxy-fuel combustion technology by the applicant especially designed for the aluminum industry is known under LTOF (low-temperature oxy-fuel). In an aluminum melting furnace, the combustion occurs under a diluted oxygen concentration by mixing the furnace gases into the combustion zone. This results in lower flame temperatures, below the point at which thermal NOx is created. Further, the energy is dispersed throughout the entire furnace for uniform heating and more efficient melting. Typical benefits are a higher melt rate of up to 50%, up to 50% lower fuel combustion, the avoidance of hotspots in the furnace, reduced flue gas volumes and NOx emissions.

These flameless and semi flameless burner technologies all rely on the very high velocity oxygen jets to generate the flameless effect. The oxygen outlet velocity is typically the speed of sound in oxygen, around 305 m/s. Velocities from about 100 m/s upwards can also be used. The high velocity jets create a very strong recirculation within the furnace gas space, resulting in the above mentioned reduced NOx generation by reducing peak temperatures within the flame and in a very homogeneous heating of the furnace. Such burner technologies have proven very efficient and useful especially in essentially clean dust free furnace atmospheres.

When used in a dirty or dusty furnace environment (combustion space) or a furnace environment with entrained liquid droplets, these particles or droplets are also recirculated, and, due to their higher momentum, tend to be deposited on the refractory wall surrounding the high velocity jet outlets. Such deposits are also sometimes referred to as accretions. These either block the outlets or disturb the gas jets and reduce its recirculating efficiency. This causes high maintenance and/or reduces the typically benefits of NOx reduction and homogeneous heating. The deposits could also deflect the high speed jet towards the furnace refractory wall causing severe damage. In the worst case, combustion system safety can no longer be guaranteed.

In the other technical field of nickel and copper converting, under the name of ALSI (Air Liquide Shrouded Injector) a shrouded injector technology has been applied to Hoboken and Peirce-Smith converters for processing of copper and nickel mattes. Problems existing beforehand, such as tuyere blockage, refractory wear and limits in the oxygen enrichment in the converters could be significantly reduced by this technology. A shrouded injector comprises an inner pipe through which oxygen enriched air is injected. The inner pipe is surrounded by an annulus through which nitrogen (or other inert gases or hydrocarbon) flows. The nitrogen locally cools the periphery of the injector tip. This generates an accretion of solid bath that protects the adjacent refractory from excessive erosion. The pressures at which the gases are injected prevent the accretion from blocking the flow of gas, so the shrouded injector operates without a need for punching. The ALSI technology is, however, not a burner technology, but makes use of an air/oxygen injection system that is used under a liquid copper or nickel bath. The intention is to move the very hot exothermic reactions away from the tuyere tip in order to prevent them from being damaged by the high heat generation.

It is an object underlying the present invention to provide a new burner technology which avoids the disadvantages in the prior art, especially when used in a droplets or particles containing furnace environment. In particular, the benefits of known flameless and semi flameless burner technologies, namely, a reduced NOx generation and homogeneous heating of the furnace, should be retained as far as possible.

SUMMARY OF THE INVENTION

The present invention provides a method for heating a furnace used for metal processing by combusting a fuel in the furnace by supplying an oxidizing gas through an oxidizing gas supply line into the furnace and by supplying a fuel through a fuel supply line into the furnace and a corresponding burner having at least one oxidizing gas supply line and at least one fuel supply line according to the independent claims. Advantageous embodiments are the subject matter of the dependent claims and the description that follows.

According to the method of the present invention, the oxidizing gas is supplied in form of a central oxidizing gas flow together with a first shroud gas flow and/or the fuel is supplied in form of a central fuel flow together with a second shroud gas flow. By providing a shroud gas flow, the central flow, especially when provided in the form of a high velocity jet, will initially suck the shrouding gas flow into itself rather than the surrounding furnace atmosphere. Only once the shroud gas has been aspired into the central flow/jet, will the flow/jet start sucking the furnace atmosphere into itself, thereby moving the point of recirculation away from the refractory wall and the supply line outlet, thus reducing or eliminating the deposition of solid particles or droplets onto the refractory wall and the supply line outlet.

The corresponding burner according to the present invention has at least one oxidizing gas supply line comprising a central oxidizing supply line for suppling oxidizing gas and a first annular supply line surrounding the central oxidizing gas supply line for supplying a first shroud gas flow and/or at least one fuel supply line comprising a central fuel supply line for supplying fuel and a second supply line surrounding the central fuel supply line for supplying a second shroud gas flow.

In contrast, the ALSI technology as discussed above applies a shrouded submerged injection system which requires a second high pressure gas source, typically nitrogen. Oxygen cannot be used as a shroud gas because this would negate the object of moving the reaction zone away from the tuyere outlet. As further explained below, according to the present invention for the central oxidizing gas flow it is preferred to use the same oxidizing gas as the first shroud gas flow.

Advantageously, the central gas (provided that the central flow is in form of a gas) is also used as the shroud gas. This simplifies the installation as less piping and control equipment is required. Depending on the geometry of the central supply line and the surrounding shroud gas supply line, the shroud gas proportion can be a pure mechanical function not prone to failure or control inaccuracies.

Advantageously, the velocity of the central oxidizing gas flow is higher than the velocity of the first shroud gas flow, especially the velocity of the central oxidizing gas flow is essentially or exactly equal to or even higher than the sonic velocity of the oxidizing gas. This enhances the suction effect whereby the first shroud gas flow is sucked into the central oxidizing gas flow.

The same applies to the fuel flow if the velocity of the central fuel flow is higher than the velocity of the second shroud gas flow, especially if the velocity of the central fuel flow is essentially or exactly equal to or ever higher than the sonic velocity of the fuel. In practice, fuel gases are typically supplied with a low supply pressure. There is, however, gaseous fuel like natural gas (NG) or LPG which can be supplied with a high enough supply pressure.

Advantageously, the ratio of the flow rates of the first shroud gas flow and the central oxidizing gas flow is adjusted. In the same way, it is advantageous to adjust the ratio of the flow rates of the second shroud gas flow and the central fuel flow.

In order to implement an adjustment or a variation of the ratios of the respective flow rates it is preferred for the first annular supply line of the burner to be in fluid connection with at least two first nozzles opening up into the first annular supply line and/or for the second annular supply line to be in fluid connection with at least two second nozzles opening up into the second annular supply line. By adjusting the diameter and the number of the small nozzles feeding the annulus, the ratio of the flow rates of the shroud gas and central fluid flow can be varied according to the needs of the process. A larger number of smaller nozzles is preferred to a single or fewer slightly larger nozzles. This is especially true if—especially in case of the oxidizing gas—the shroud gas is the same as the central fluid. In this case, the same gas could be supplied to the central supply line and to the annular supply line. A large number of smaller nozzles can prevent damage to the annular supply line material by the high velocity, especially sonic velocity, entering the narrow annulus. Too small holes would be susceptible to blocking by dirt entrained in the gas flow. There will always be a lower limit of the nozzle diameter that is technically achievable and economically viable and that can be operated under normal process conditions without getting blocked, unless if ultrafine filtration and very clean conditions are used—which are neither typical nor required in these kinds of applications and environments.

For the reasons above, it is advantageous if the first shroud gas flow is or contains the oxidizing gas and/or if the second shroud gas flow is or contains the fuel.

However, the shroud gas does not necessarily have to be the same as the central fluid. The first shroud gas flow may be or may contain air, steam or flue gases (theoretically also an inert gas like argon, although it may not make economic sense, nitrogen should not be used as this will (may) increase NOx generation) or a combination thereof. Such shroud gases would have to be supplied through at least one separate line, ideally also with some form of flow control or regulation. The shroud gas could also be flue gases provided that the flue gases are sufficiently clean to avoid blocking of the nozzles and/or the annular supply line. The nozzles are used to create a fixed ratio (mechanically) between central and shroud flows when the same gas for the shroud as for the central flow is used. If one uses a different shroud gas, then there will be no such connection between the central gas and the shroud gas. As the present invention is especially applied to dirty and dusty furnace atmosphere, flue gases would have to be purified before using them as a shroud gas. Theoretically, one could use flue gases, but it may not be technically or economically feasible. If flue gases are used, then they would have to be cleaned to remove at least particles.

The second shroud gas flow may be or may contain air, steam or inert gas like nitrogen, argon or a combination thereof. It is noted that the fuel outlet could be implemented without any shrouding flow if the fuel outlet velocity is low, typically in the region of 80 to 100 m/s.

The fuel may be a gaseous fuel but also liquid fuels can be used for the present invention. The recirculation of poorly atomised liquid fuel droplets is a potential concern especially for flameless oxy-fuel burners as these poorly atomized liquid fuel droplets get deposited on the refractory face surrounding the burner/the respective supply lines. The shrouding of the liquid fuel, however, can assist with the atomisation and reduce the likelihood of fuel being deposited on the surrounding refractory walls. The oxidizing gas may be oxygen, especially customary oxygen of high pureness or air, especially when a high enough air pressure is available. Thus, the invention can also be implemented for air-fuel burners and is not limited to oxy-fuel burners.

It is understood that the features recited above and those yet to be explained below can be used not only in the respective combination indicated, but also in other combinations or in isolation without leaving the context of the present invention.

DESCRIPTION OF THE FIGURES

The invention is schematically depicted in the drawings on the basis of exemplifying embodiments, and will be described in detailed below with reference to the drawings.

DETAILED DESCRIPTION OF THE INVENTION

Figure 1:
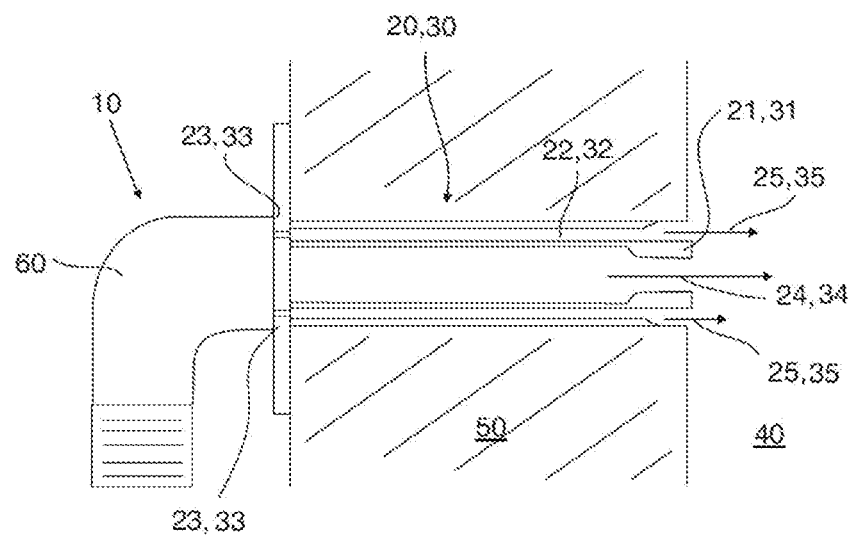
FIG. 1 schematically shows an oxidizing gas supply line or a fuel supply line of a burner according to an embodiment of the present invention.

FIG. 1 schematically shows one of the oxidizing gas supply lines 20 of a burner 10 for heating an aluminum recycling furnace 40. Hitherto, in such furnace accretions were deposited around the burner oxygen nozzles/supply lines (this could also apply to the fuel supply, although it is more common on oxygen lines because of the much higher jet velocity), usually the deposited material being fine dross dust and/or coarse solid particles—they could also be recirculated liquid metal droplets that deposit and then potentially solidify around the nozzle outlet. The invention came about in trying to prevent the recirculation of liquid copper and slag droplets in a Peirce Smith converter that occurs during the air blowing phase. Such accretions build up around the oxygen supply line 20 on the wall of the refractory 50. With a burner 10 comprising supply lines as shown in FIG. 1 such accretions are largely reduced.

The example of FIG. 1 shows one of the two oxygen supply lines 20 in a flameless oxy-fuel burner, e. g. of 1500 kW. The oxygen supply lines or lances would normally (but must not) be identical in layout. The burner 10 would typically require one fuel, e. g. natural gas, and two oxygen supply lines, with the oxygen supply lines typically installed in a single plane on either side of the central fuel supply line, the oxygen supply lines being around 50 mm away from the fuel supply line (outer wall to outer wall). This geometry is only exemplary and not relevant to the present invention. The fuel supply line (30) may look similar to the oxygen supply line 20, but typically would have larger dimensions. For illustration purposes, however, FIG. 1 shows either an oxidizing gas supply line 20 or a fuel supply line 30. The fuel supply line 30 would also have a central fuel supply line 31 and a second annular supply line 32. The corresponding gas flows are labeled 34 and 35, respectively. It should be noted, however, that since the fuel is typically injected at lower velocities, either a reduced shroud flow 35 or no shroud flow 35 could be used. Therefore, in the following, for easy of illustration, only the oxidizing gas supply line 20 is described in further detail.

The sizing of this oxygen supply line 20 is for approximately 160 Nm3/h of oxygen at a 2 barg supply pressure, by using 3×3 mm nozzles 23 opening up into the outer annular supply line 25, an oxygen flow/first shroud gas flow 25 of around 35 Nm3/h will pass through into the annulus 25 exiting the outer annulus at around 25 m/s. The balance of the oxygen flow 24 (around 125 Nm3/h) exits through the central supply line 21 preferably at the sonic velocity of oxygen. In this example, between 20 and 25% of the oxygen exits through the annulus 22. The dirtier the furnace environment, the higher this ratio would be.

The total fuel (NG) and oxygen flow must always correspond to what is required for the combustion process stoichiometry calculations.

As already mentioned above, typically the fuel gas is not injected at sonic velocity, although this is an option if sufficient pressure is available and if all safety standards and norms are complied with. If the fuel outlet velocity is low enough, then either a reduced shroud flow or no shroud flow could be used.

By adjusting the diameter and number of the small nozzles (23 for the oxidizing gas and 33 for the fuel) feeding the annulus 22, 32, the ratio of shroud gas 25,35 and central gas 24, 25 can be varied, according to the needs of the process. As already mentioned above, a large number of smaller nozzles, especially in case of oxidizing gas supplying nozzles 23, are preferable to a single or fewer slightly larger nozzles.

The supply pipe feeding the oxidizing gas supply line 20 or the fuel supply line 30 is labeled 60.

Figure 2:
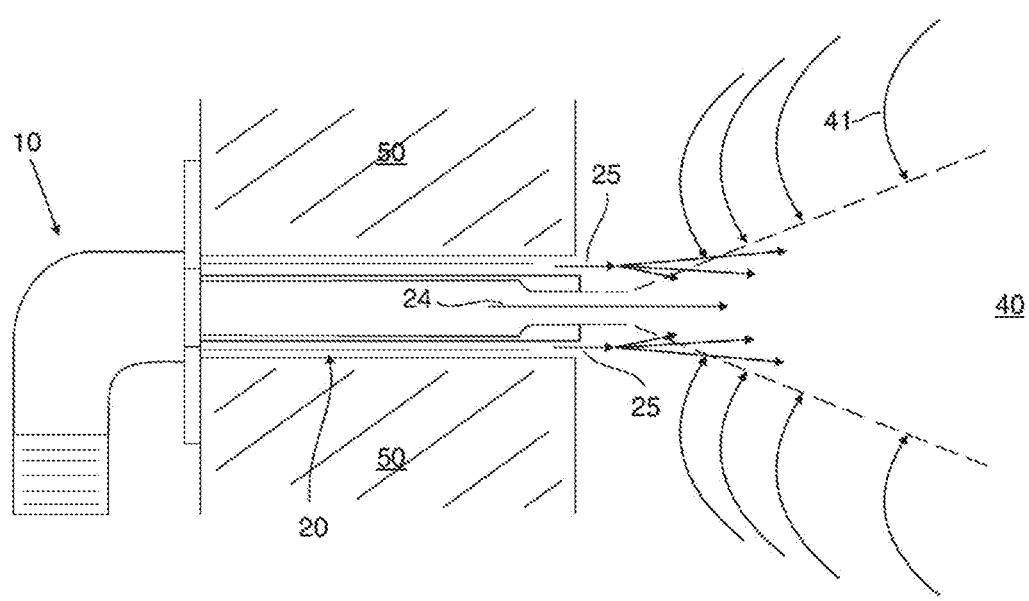
FIG. 2 shows the supply line of FIG. 1 in combination with a furnace used for metal processing implementing a method according to the present invention.

FIG. 2 shows schematically the part of the burner 10 of FIG. 1 in e. g. an aluminum recycling furnace 40. Oxygen is used as the oxidizing gas which is supplied with high pressure through the central oxygen supply line 21 and exits the supply line 21 in form of a high velocity jet 24. In this embodiment, oxygen is also used as the shroud gas. This simplifies the installation since less piping and controlling equipment is required. The shroud gas proportion is a mechanical function depending on the pressure and the geometry and number of nozzles 23. Oxygen exits the annulus 22 in form of an annular oxygen flow 25 as shown in FIG. 2.

The high velocity central oxygen jet 24 sucks parts of the furnace atmosphere back into itself resulting in a recirculation of furnace gases 41. The high velocity central jet 24 initially sucks the shrouding oxygen gas flow 25 into itself rather then the surrounding furnace atmosphere. Only once the shroud gas 25 has been aspired into the jet 24, the jet 24 will start sucking the furnace gases 41 into itself. The point of recirculation is thus moved away from the wall of the refractory 50 and away from the supply line tip. This reduces or even eliminates the deposition of solid or liquid particles in the recirculated furnace atmosphere around the supply line outlet on to the wall of the refractory 50.

As already mentioned in the general part of the description, the shroud gas must not necessarily be the same as the central gas. The system is not limited to a single fuel and two to or four oxygen supply lines configuration. A single oxygen supply line as well multiple oxygen supply lines (3, 5, 6 even 8) are also conceivable. The system can also be implemented in air-fuel burners especially when a high enough air pressure is available.

LIST OF REFERENCE SIGNS

10 Burner
20 Oxidizing gas supply line
21 Central oxidizing supply line
22 First annular supply line
23 Nozzle
24 Central oxidizing gas jet/flow
25 Annular oxidizing gas flow, first shroud gas flow
30 Fuel supply line
31 Central fuel supply line
32 Second annular supply line
33 Nozzle
34 Central fuel flow
35 Second shroud gas flow
40 Furnace
41 Recirculated furnace gases
50 Refractory
60 Supply pipe

What is claimed is:

1. A method for heating a furnace (40) used for metal processing, comprising:
   supplying an oxidizing gas through an oxidizing gas supply line (20) into the furnace (40), the oxidizing gas supplied as a central oxidizing gas flow (24) together with a first shroud gas flow (25) for the central oxidizing gas flow (24),
   supplying a fuel through a fuel supply line (30) into the furnace (40), the fuel supplied as a central fuel flow (34) together with a second shroud gas flow (35) for the central fuel flow (34),
   initially sucking the first shroud gas flow (25) into itself, and subsequently sucking an atmosphere of the furnace (40) into itself for moving a point of recirculation of the atmosphere away from a refractory wall of the furnace, and reducing particles in the atmosphere of the furnace (40) where the first shroud gas flow (25) is occurring in the furnace atmosphere.

2. The method of claim 1, further comprising supplying the central oxidizing gas flow (24) at a velocity higher than a velocity of the first shroud gas flow (25).

3. The method of claim 1, further comprising supplying the central fuel flow (34) at a velocity higher than a velocity of the second shroud gas flow (35).

4. The method of claim 1, further comprising supplying the central oxidizing gas flow (24) at a velocity at least equal to or higher than a sonic velocity of the oxidizing gas.

5. The method of claim 1, further comprising supplying the central fuel flow (34) at a velocity at least equal to or higher than a sonic velocity of the fuel.

6. The method of claim 1, further comprising adjusting a ratio of a flow rate of the first shroud gas flow (25) and a flow rate of the central oxidizing gas flow (24).

7. The method of claim 1, further comprising adjusting a ratio of a flow rate of the second shroud gas flow (35) and a flow rate of the central fuel flow (34).

8. The method of claim 1, wherein the first shroud gas flow (25) comprises the oxidizing gas.

9. The method of claim 1, wherein the second shroud gas flow (35) comprises the fuel.

10. The method of claim 1, wherein the first shroud gas flow (25) comprises a gas selected from the group consisting of air, steam, an inert gas, flue gases, and a combination thereof.

11. The method of claim 1, wherein the second shroud gas flow (35) comprises a gas selected from the group consisting of air, steam, inert gas, and a combination thereof.

12. The method of claim 1, wherein the fuel is selected from the group consisting of a gaseous fuel, and a liquid fuel.

13. The method of claim 1, wherein the oxidizing gas is selected from the group consisting of oxygen, and air.

\* \* \* \* \*